United States Patent [19]
Schlossberg et al.

[11] 3,835,416
[45] Sept. 10, 1974

[54] TUNABLE OFF RESONANT OPTICALLY PUMPED LASER

[75] Inventors: Howard R. Schlossberg, Lexington; Harold R. Fetterman, Waltham; Jerry Waldman, Lexington, all of Mass.

[73] Assignee: The United States of America as represented by the Secretary of the Air Force, Washington, D.C.

[22] Filed: Mar. 13, 1973

[21] Appl. No.: 340,810

[52] U.S. Cl. ............... 331/94.5 P, 356/85, 356/96, 307/88.3, 330/4.3
[51] Int. Cl. ............................................ H01s 3/09
[58] Field of Search ............... 331/94.5; 356/85, 96; 307/88.3; 330/4.3

[56] References Cited
OTHER PUBLICATIONS

Sorokin et al., The Journal of Chemical Physics, Vol. 54, No. 5, 1 Mar., 1971, pp. 2184-2190 QD 1 J83.
Oka et al., Applied Physics Letters, Vol. 19, No. 4, 15 Aug., 1971, pp. 88-90 QC 1 A457.
Turgeon, IEEE Journal of Quantum Electronics, Vol. QE-7, Oct., 1971, pp. 495-497 QC 447 I2.

Primary Examiner—Ronald L. Wibert
Assistant Examiner—R. J. Webster
Attorney, Agent, or Firm—Harry A. Herbert, Jr.; Jacob N. Erlich

[57] ABSTRACT

A tunable off resonant optically pumped laser system in which a high power pulsed laser is utilized to optically pump a molecular gas having a vibrational absorption band near the laser frequency. The electric field of the pumping laser is at least as great as a predetermined strength so that upon the application of a D.C. electric field on the absorbing gas the resultant submillimeter laser oscillation is capable of being tuned.

5 Claims, 1 Drawing Figure

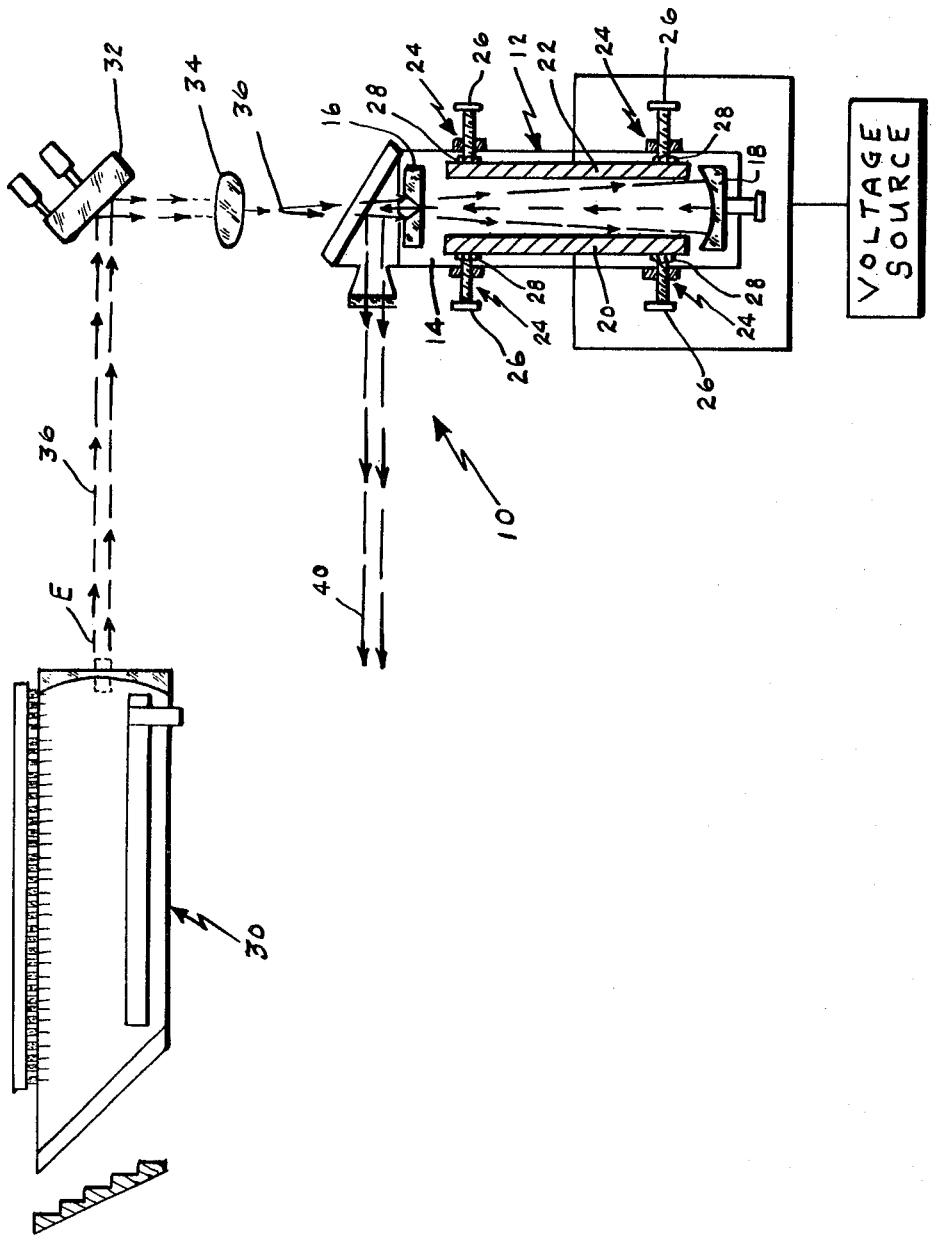

TUNABLE OFF RESONANT OPTICALLY PUMPED LASER

BACKGROUND OF THE INVENTION

This invention relates generally to submillimeter or far infrared spectroscopy, and more particularly, to a tunable off resonant optically pumped laser for use therein.

Submillimeter or far infrared spectroscopy concerns the study of the properties of material systems by means of their interaction with far infrared radiation dispersed into a spectrum. This region is valuable for study of the structure of matter because rotational frequencies of molecules fall in this range.

The infrared spectra can be used to identify pure chemical compounds by comparison of the spectrum of an unknown with previously recorded spectra of pure compounds. Furthermore, this spectra can be used to identify the constituents of simple mixtures when the spectra of the possible constituents are known. The infrared spectra of solids give information about modes of vibration of crystal lattices, about hydrogen-bond vibrations in crystals held together by such bonds, and about electronic energy levels in semi-conductors and superconductors. Hence submillimeter spectrometers are often used by solid-state physicists.

The laser is playing an important part in submillimeter spectroscopy. For example, optically pumped molecular systems, lasing on pure rotational transitions, now adapt the power and stability of near-infrared lasers for submillimeter research. Already, flow-discharge molecular lasers such as $H_2O$, $D_2O$, HCN, DCN, $SO_2$ and $H_2S$ have significantly changed the nature of submillimeter spectroscopy. But in the variety of molecules it can excite, the flow-discharge technique has gone about as far as it can go in emission lines and power available. Optical pumping on the other hand, demonstrably makes the desirable features of near-infrared lasers available for far-infrared, or submillimeter applications. In all such lasers reported, however, coincidence has been required between the pump laser frequency and a vibrational absorption of the molecule. This restriction limits the number of useful lines and creates frequency fluctuations. Furthermore, there can be no provisions in the laser systems of the past for achieving tunable submillimeter emission.

SUMMARY OF THE INVENTION

The instant invention sets forth a system for off resonant optically pumping a laser which overcomes the difficulties set forth hereinabove. With this invention submillimeter laser oscillation on pure rotational transitions are capable of being pumped by a laser source at frequencies many linewidths removed from the peak of a vibration-rotation transition. The off resonant optical pumping of this invention makes it possible to optically pump almost any gas laser with a permanent dipole moment and an absorption band near 10 $\mu$. Many new high intensity submillimeter wavelengths can be generated in this manner. Furthermore, tunability of the laser is possible in the instant invention with the application of D.C. electrical fields since the effect of the electric field on the vibrational absorption will not destroy the required pumping conditions.

This invention utilizes a high power pulsed laser to optically pump a molecular gas which has a vibrational absorption band near the pumping laser frequency. It is essential that the electric field E of the pumping laser be made sufficiently large so that the quantity $\mu E/h$ is comparable to $\omega - \omega_o$; where $\mu$ is the dipole matrix element of a particular vibration-rotation absorption line, $h$ is Planck's constant, and $\omega$ and $\omega_o$ are the frequency of the laser and absorption line center of the gas, respectively.

A low loss resonator for submillimeter or millimeter wavelengths is provided about the absorbing gas. Furthermore, adjustable metal plates are located within the resonator in order to impose a DC field on the absorbing gas. The high power pulse laser will pump the absorbing gas into a particular vibration-rotation level which will cause inversion of population between this level and a lower rotational or inversion level. Laser oscillation at submillimeter or millimeter wavelengths will ensue. The tunability of this laser is accomplished by Stark-shifting the rotational states by putting a voltage across the gas by means of the metal plates therein.

It is therefore an object of this invention to provide a laser which is capable of being pumped by a laser source at frequencies many linewidths removed from the peak of a vibration-rotation transition.

It is another object of this invention to produce an off resonant optically pumped laser which is capable of being tuned by applied electric fields.

It is a further object of this invention to provide a tunable off resonant optically pumped laser which is simple in construction, economical to produce and which utilizes conventional, currently available components that lend themselves to standard mass producing techniques.

For a better understanding of the present invention together with other and further objects thereof reference is made to the following description taken in conjunction with the accompanying drawing and its scope will be pointed out in the appended claims.

DESCRIPTION OF THE DRAWING

The only FIGURE of the drawing is a schematic illustration of the tunable off resonant optically pumped laser of this invention.

DETAILED DESCRIPTION OF THE PREFERRED EMBODIMENT

Reference is now made to the only FIGURE of the drawing which shows in schematic fashion the submillimeter laser system 10 of this invention. This system incorporates a housing 12 which contains therein any suitable gas 14 such as ammonia. A pair of reflective surfaces 16 and 18 respectively, are located at opposite ends of housing 12 thereby forming an optical resonator. Reflective surface 16 is preferably in the form of a partially reflective mirror while reflective surface 18 is in the form of a totally reflective mirror. A pair of metal plates 20 and 22 are adjustably mounted within housing 12 by any suitable adjustable securing means 24 such as a threaded bolt 26 rotatably secured at 28 to metal plates 20 and 22.

Gas 14 within housing 12 is pumped into a particular vibration-rotation level in order to cause inversion of population between this level and a lower rotational level. Once accomplished laser oscillation at a submillimeter or millimeter wavelengths will take place. Any suitable high power laser source 30 such as a high power $CO_2$ laser is used to pump gas 14 into the particular vibration-rotation level. Gas 14 should have a vibration absorption band near the frequency of laser 30. The electrical field E emanating from laser 30 is directed by any suitable reflective surface 32 and through lens 34 to the resonator and is represented by the arrows 36 shown in the drawing.

Heretofore, in all submillimeter laser systems coincidence has been required between the pump laser frequency and a vibration absorption band of the molecular gas. In the instant invention submillimeter laser oscillation on pure rotation transitions may be pumped by a laser 30 at a frequency many linewidths removed from the peak of a vibration-rotation transition. This system is thereby capable of generating new high intensity submillimeter wavelengths.

The requirements for the off resonant optically pumped laser 10 of this invention are set forth hereinbelow and are best understood by considering the simplified case of saturated absorption in a two level system with energy separation $h\omega_o$ irradiated by a field at infrared frequency $\omega$. The population difference $\Delta N$ between the lower and upper state in this model is given by $$\Delta N = N_o [1 + (\omega - \omega_o)^2 T_2^2]/1 + (\omega - \omega_o)^2 T_2^2 + (\mu E/h)^2 T_1 T_2$$

(1)

where $\mu$ is the dipole matrix element between the two states, $T_1$ and $T_2$ are relaxation times for energy and phase coherence, respectively ($T_2$ is the inverse linewidth), and $N_o$ is the population difference in the absence of the field and is close to the number in the lower state for $\omega_o$ in the infrared. For the system of interest $T_1 \approx T_2$, since rotational relaxation and dephasing times are both on the order of the kinetic collision time. If $\omega$ differs from $\omega_o$ by many linewidths, then $(\omega-\omega_o)T_2 >> 1$ and equation (1) reduces to $$\Delta N = N_o [1 + (\mu E/h^2/(\omega - \omega_o)^2]^{-1}$$

(2)

Equation (2) shows that the population of the upper state becomes an appreciable fraction of the total if $$\mu E/h \gtrsim \omega - \omega_o$$

(3)

Equation (3) gives an estimate of how far off resonance the absorbing system can be pumped.

It is therefore seen that the electrical field E of the pumping laser 30 is made sufficiently large so that the quantity $\mu E/h$ is of the magnitude of or greater than $\omega - \omega_o$. With the electrical field $E$ defined it is now possible to state that for the off resonant optically pumped laser system 10 of this invention to be operative the intensity of the pumping laser 30 must be equal to $c/8\pi E^2$ where c is the speed of light and $E$ represents the electrical field of laser 30.

With the utilization of the off resonant optical pump laser system 10 of the present invention tuning is possible for output 40 of laser system 10, a feat virtually impossible with the submillimeter laser systems of the past which required coincidence between the pump laser frequency and a vibration absorption band of the gas. The tuning of this invention is accomplished by the imposition of a DC field on the absorption gas 14 by metal plates 20 and 22. The field is created by a voltage source 42 connected thereto. Plates 20 and 22 may be adjusted in spacing by the procedure heretofore described or the voltage may be varied in order to change this field.

Such a high pulsed submillimeter laser system 10 as defined in this invention has important application in plasma diagnostics and plasma heating with the tunability of the laser making this instrument an invaluable tool in investigating, assaying and controlling properties of electrical materials. Furthermore, system 10 of this invention is also valuable in determining narrow band transmission properties of the atmosphere at submillimeter wavelengths.

Although this invention has been described with reference to a particular embodiment it will be understood to those skilled in the art that this invention is also capable of a variety of alternate embodiments within the spirit and scope of the appended claims.

We claim:

1. An off resonant optically pumped laser system comprising a resonator, a molecular gas located within said resonator, and a pumping laser producing a beam of light in optical alignment with said resonator for pumping said gas in an off resonant mode, said gas having a vibrational absorption band near but not at the emission frequency of said laser and the electrical field, $E$, of said pumping laser being sufficiently large so that the quantity $\mu E/h \quad \omega-\omega_o$ where $\omega-\omega_o \quad 0$ and where $\mu$ is the dipole matrix of said particular vibrational absorption band, $h$ is Planck's constant, and $\omega$ and $\omega_o$ are the frequency of emission of said pumping laser and the frequency of said absorption band center of said gas, respectively, so that said optical pumping of said laser system takes place in the off-resonant condition.

2. An off resonant optically pumped laser system as defined in claim 1 further comprising a pair of parallel spaced metal plates located in said resonator and a voltage source connected thereto whereby upon the application of a voltage to said plates the output of said laser system may be tuned.

3. An off resonant optically pumped laser system as defined in claim 2 wherein said voltage source is variable.

4. An off resonant optically pumped laser system as defined in claim 2 wherein said metal plates are adjustable in spacing.

5. A method of optically pumping a laser system in the off-resonant condition comprising the steps of:
   a. placing a molecular gas within a resonator, said gas having a vibrational absorption band center $\omega_o$;
   b. off resonantly pumping said gas by applying a pumping laser beam to said molecular gas, said pumping laser beam having a frequency $\omega$ and being near but not at said vibrational absorption band of said gas to provide a population inversion in said gas; and
   c. ensuring that the electrical field, E, of said pumping laser is sufficiently large so that the quantity $\mu E/h \quad \omega-\omega_o$ where $\omega-\omega_o \quad 0$ and where $\mu$ is the dipole matrix of said vibrational absorption band and $h$ is Plank's constant so that said optical pumping of said laser system takes place in the off-resonant condition.

\* \* \* \* \*